(12) United States Patent
Lu (10) Patent No.: US 9,861,204 B2
(45) Date of Patent: Jan. 9, 2018

(54) AUTOMATIC SUPPORT SYSTEM FOR HEADREST

(71) Applicant: Dongguan Weihong Hardware and Plastic Products Co., Ltd., Dongguan (CN)

(72) Inventor: Wei Lu, Dongguan (CN)

(73) Assignee: DONGGUAN WEIHONG HARDWARE AND PLASTIC PRODUCTS CO., LTD., Dongguan (CN)

(*) Notice: Subject to any disclaimer, the term of this patent is extended or adjusted under 35 U.S.C. 154(b) by 35 days.

(21) Appl. No.: 15/099,399

(22) Filed: Apr. 14, 2016

(65) Prior Publication Data

US 2016/0227934 A1   Aug. 11, 2016

(30) Foreign Application Priority Data

Jan. 25, 2016 (CN) .......................... 2016 1 0052813

(51) Int. Cl.
*A47C 1/10* (2006.01)
*A47C 7/38* (2006.01)
*A47C 17/04* (2006.01)
*F16H 21/44* (2006.01)

(52) U.S. Cl.
CPC ................ *A47C 7/38* (2013.01); *A47C 17/04* (2013.01); *F16H 21/44* (2013.01)

(58) Field of Classification Search
CPC .......................... B64D 11/0642; A61G 15/125
USPC .......................... 297/394, 408, 410, 391, 396
See application file for complete search history.

(56) References Cited

U.S. PATENT DOCUMENTS

| | | | | |
|---|---|---|---|---|
| 3,877,751 A | * | 4/1975 | Rasmussen | A47C 7/38 297/408 |
| 3,885,831 A | * | 5/1975 | Rasmussen | A47C 7/38 297/405 |
| 4,312,538 A | * | 1/1982 | Kennedy | A47C 7/38 297/375 |
| 4,626,028 A | * | 12/1986 | Hatsutta | B60N 2/2222 297/284.1 |
| 5,011,225 A | * | 4/1991 | Nemoto | B60N 2/4852 297/408 |
| 5,145,233 A | * | 9/1992 | Nagashima | B60N 2/487 297/403 |
| 6,702,377 B2 | * | 3/2004 | Nakano | B60N 2/4808 297/216.12 |

(Continued)

*Primary Examiner* — Jose V Chen
(74) *Attorney, Agent, or Firm* — Shimokaji IP (57) ABSTRACT

An automatic support system for headrest includes a first fastener, a connecting component, a driving rod, a first swinging component, a first sleeve component, and a linear drive device; The linear drive device is pivotally connected to the first fastener and has an output shaft that is capable of linearly sliding, a front end of the connecting component is pivotally connected to the first fastener, the output shaft of the linear drive device and one end of the driving rod are respectively pivotally connected to two spaced positions of a rear end of the connecting component, a front end of the first swinging component is pivotally connected to the first fastener, the other end of the driving rod is pivotally connected to a rear end of the first swinging component, and the first sleeve component is fixed to a headrest and set on the first swinging component detachably.

8 Claims, 10 Drawing Sheets

(56) References Cited

U.S. PATENT DOCUMENTS

| | | | | |
|---|---|---|---|---|
| 6,719,373 | B2* | 4/2004 | Zimmermann | A47C 7/38 |
| | | | | 297/391 |
| 6,783,177 | B1* | 8/2004 | Nakano | B60N 2/4817 |
| | | | | 297/216.12 |
| 6,789,846 | B2* | 9/2004 | Humer | B60N 2/4228 |
| | | | | 297/216.12 |
| 2002/0084686 | A1* | 7/2002 | Takata | B60N 2/4855 |
| | | | | 297/408 |
| 2004/0195895 | A1* | 10/2004 | Sedlatschek | A47C 7/38 |
| | | | | 297/408 |
| 2011/0101762 | A1* | 5/2011 | Lutzka | B60N 2/4844 |
| | | | | 297/408 |
| 2014/0203615 | A1* | 7/2014 | Little | B60N 2/4808 |
| | | | | 297/408 |
| 2015/0367764 | A1* | 12/2015 | Laperriere, III | B60N 2/4847 |
| | | | | 297/408 |

* cited by examiner

AUTOMATIC SUPPORT SYSTEM FOR HEADREST

RELATED APPLICATIONS

This application claims the benefit of priority to Chinese Patent Application No. 201610052813.4 filed in Jan. 25, 2016, which is hereby incorporated by reference in its entirety.

FIELD OF THE INVENTION

The present invention relates to a field of furniture parts, more particularly to an automatic support system for automatically adjusting a tilting angle of a sofa headrest.

BACKGROUND OF THE INVENTION

Commonly, angles of a headrest of a sofa can be adjusted to meet the requirement of the customers. One of the new achievement manners is to set a hinge connected with the headrest in the seat or sofa, and the angle of the headrest is changed when the headrest is pivoted together with the hinge. As such, the customer can adjust the tilting angle of the headrest according to his actual requirement to obtain a comfortable feeling. However, this adjusting manner must require a manual operation to pull the headrest, which brings an inconvenient operation. In order to adjust the angle of the headrest conveniently, the hinge in the seat or sofa is replaced with an electric headrest support system, an upper end of the headrest support system is fixed to the headrest, and the angle of the headrest can be adjusted automatically by a motor without manual operation.

However, the conventional headrest support system just can be applied to a one-piece sofa that the headrest support system thereof can not be separated from the sofa body after being installed, while actually, most headrest support systems of sofas are configured to be detachable to facilitate cleaning or replacement.

Thus it's necessary to provide a headrest support system for automatically adjusting a tilting angle of a sofa headrest and being installed in a detachable sofa.

SUMMARY OF THE INVENTION

One objective of the present invention is to provide a headrest support system for automatically adjusting a tilting angle of a sofa headrest and being installed in a detachable sofa.

To achieve the above objective, an automatic support system for headrest is provided, which includes a first fastener, a connecting component, a driving rod, a first swinging component, a first sleeve component, and a linear drive device; wherein the linear drive device is pivotally connected to the first fastener and has an output shaft that is capable of linearly sliding, a front end of the connecting component is pivotally connected to the first fastener, the output shaft of the linear drive device and one end of the driving rod are respectively pivotally connected to two spaced positions of a rear end of the connecting component, a front end of the first swinging component is pivotally connected to the first fastener, the other end of the driving rod is pivotally connected to a rear end of the first swinging component, and the first sleeve component is fixed to a headrest and set on the first swinging component in a sleeve-type and detachable manner.

In comparison with the prior art, the first fastener of the automatic support system for headrest of the present invention is fixed and installed in a sofa or seat, the first sleeve component is fixed and installed in the headrest, the connecting component is urged to swing when the output shaft of the linear drive device is slid and extended out, and then the connecting component urges the first swinging component to swing via the driving rod, and the first sleeve component connected to the first swinging component is swung, thus the headrest adjustment is implemented. Additionally, the first sleeve component is set on the first swinging component in a sleeve-type and detachable manner, that is, the first sleeve component can be removed from the first swinging component, so the automatic support system for headrest can be installed in a detachable sofa whose headrest can be removed therefrom.

Preferably, the first fastener includes a fixing plate and a mounting plate, the connecting component and the first swinging component are respectively pivotally connected to the fixing plate, a lower end of the mounting plate is fixed to the fixing plate, and the linear drive device is pivotally connected to an upper end of the mounting plate. The upper end of the mounting plate may be bent away from the fixing plate, so that the operation of the linear drive device fixed on the mounting plate would not be interfered by the fixing plate.

Preferably, the connecting component includes an upper end portion and a U-shaped lower end portion, the lower end portion is pivotally connected to the output shaft of the linear drive device, a front end of the upper end portion is pivotally connected to the first fastener, a rear end of the upper end portion is fixed to the lower end portion, and the one end of the driving rod is pivotally connected to the rear end of the upper end portion. The connecting component is composed of the upper end portion and the lower end portion, the structure of the connecting component can meet the requirement that it can be pivotally connected to the first fastener, the driving rod and the output shaft of the linear drive device simultaneously, so that they can be mutually moved.

Preferably, the first sleeve component has a slot where the first swinging component is inserted therein. The first sleeve component is configured with the slot, and the installation can be completed easily and quickly by setting the first sleeve component on the first swinging component.

Preferably, a lower end of the first swinging component is pivotally connected to the first fastener and the driving rod, a width of the first swinging component is gradually reduced from bottom to top, and the width of the slot is configured to correspond with that of the first swinging component. The width of the first swinging component and the slot are configured to be reduced from bottom to top, and the first sleeve component can be positioned by setting the slot on the first swinging component without any other limiting component.

Preferably, the automatic support system for headrest further includes a second fastener, a second swinging component and a second sleeve component, the second fastener is disposed opposite to the first fastener, the second swinging component is pivotally connected to the second fastener, and the second sleeve component is fixed to the headrest and set on the second swinging component in a sleeve-type and detachable manner. The first fastener, the first swinging component, and the first sleeve component are disposed on a side of the sofa and the headrest, and the second fastener, the second swinging component, and the second sleeve component are disposed on the other side of the sofa and the headrest, so that both sides of the sofa and the headrest are provided an equipment for rotating the headrest, and the adjusting process of the headrest is stable.

Preferably, a limiting column is fixed to the second fastener, a curved limiting groove is opened in the second swinging component, and the limiting column is slid in the limiting groove. As the limiting column is slid in the limiting groove, so the rotating angle of the second swinging component relative to the second fastener can be limited, and the angle range of the headrest can be controlled.

Preferably, the first fastener is fixed to a lower side plate, the second fastener is fixed to another lower side plate, a horizontal plate is connected and fixed between the two lower side plates, the first sleeve component is fixed to an upper side plate, the second sleeve component is fixed to another upper side plate, and a top plate is connected and fixed between the two upper side plates.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

The objective of the present invention is to provide an automatic support system for headrest, which can be mounted in a sofa body and a headrest so as to automatically adjust the headrest to any angle, and the headrest can be removed from the sofa body.

As illustrated in FIGS. 1-4, the automatic support system for headrest includes a first side assembly and a second side assembly, the first and second side assemblies are respectively mounted to two sides of a sofa. Wherein, the first side assembly includes a first fastener, a connecting component 30, a driving rod 31, a first swinging component 32, a first sleeve component 33, and a linear drive device 34. The second side assembly includes a second fastener 35, a second swinging component 36 and a second sleeve component 37.

The first fastener includes a fixing plate 391 and a mounting plate 392, the fixing plate 391 may be fixed in a side of the sofa body, a lower end of the mounting plate 392 is fixed to a lower end of the fixing plate 391, and an upper end of the mounting plate 392 is bent away from the fixing plate 391. The linear drive device 34 is pivotally connected to the upper end of the mounting plate 392, the linear drive device 34 has an output shaft 341 that is capable of linearly sliding, and the output shaft 341 is configured upwardly. The linear drive device 34 of the present embodiment is a linear motor.

The connecting component 30 includes an upper end portion 301 and a U-shaped lower end portion 302, a front end of the upper end portion 301 is pivotally connected to the fixing plate 391 with a pivot configured between two ends of the fixing plate 391, a rear end of the upper end portion 301 is bent away from the fixing plate 391 and fixed on a side of the lower end portion 302. The upper end portion 301 and the lower end portion 302 can be formed integrally. The lower end portion 302 is set on the output shaft 341 and pivotally connected to the output shaft 341. A lower end of the driving rod 31 is pivotally connected to the rear end of the upper end portion 301, a front end of a bottom of the first swinging component 32 is pivotally connected to an upper end of the fixing plate 391, and an upper end of the driving rod 31 is pivotally connected to a rear end of the bottom of the first swinging component 32. A width of the upper end of the first swinging component 32 is gradually reduced from bottom to top.

The first sleeve component 33 is fixed in a side of the headrest, the first sleeve component 33 has a downward slot 38 opened therein, and a width of the slot 38 is gradually reduced from bottom to top, so that the shape of the slot 38 correspond with that of the first swinging component 32, the first sleeve component 33 and the first swinging component 32 are connected together in a sleeve-type and detachable manner, that is, the first sleeve component 33 can be set on the first swinging component 32, and the first sleeve component 33 can be removed from the first swinging component 32.

The second fastener 35 is fixed to the other side of the sofa body and disposed opposite to the first fastener, and a limiting column 351 is fixed to the second fastener 35, the second fastener 35 is pivotally connected to the second swinging component 36 with a pivot configured between two end of the second swinging component 36, a curved limiting groove 361 is opened in the second swinging component 36, and the limiting column 351 is slid in the limiting groove 361 so as to restrict the rotating angle of the second swinging component 36 relative to the second fastener 35. The width of an upper end of second swinging component 36 is also gradually reduced from bottom to top. The second sleeve component 37 is fixed to the other side of the headrest, another downward slot 38 is opened in the second sleeve component 37, the width of the slot 38 is gradually reduced from bottom to top, and the second sleeve component 37 and the second swinging component 36 are connected together in a sleeve-type and detachable manner, that is, the second sleeve component 37 can be set on the second swinging component 36 and can be removed from the second swinging component 36.

Figure 1:
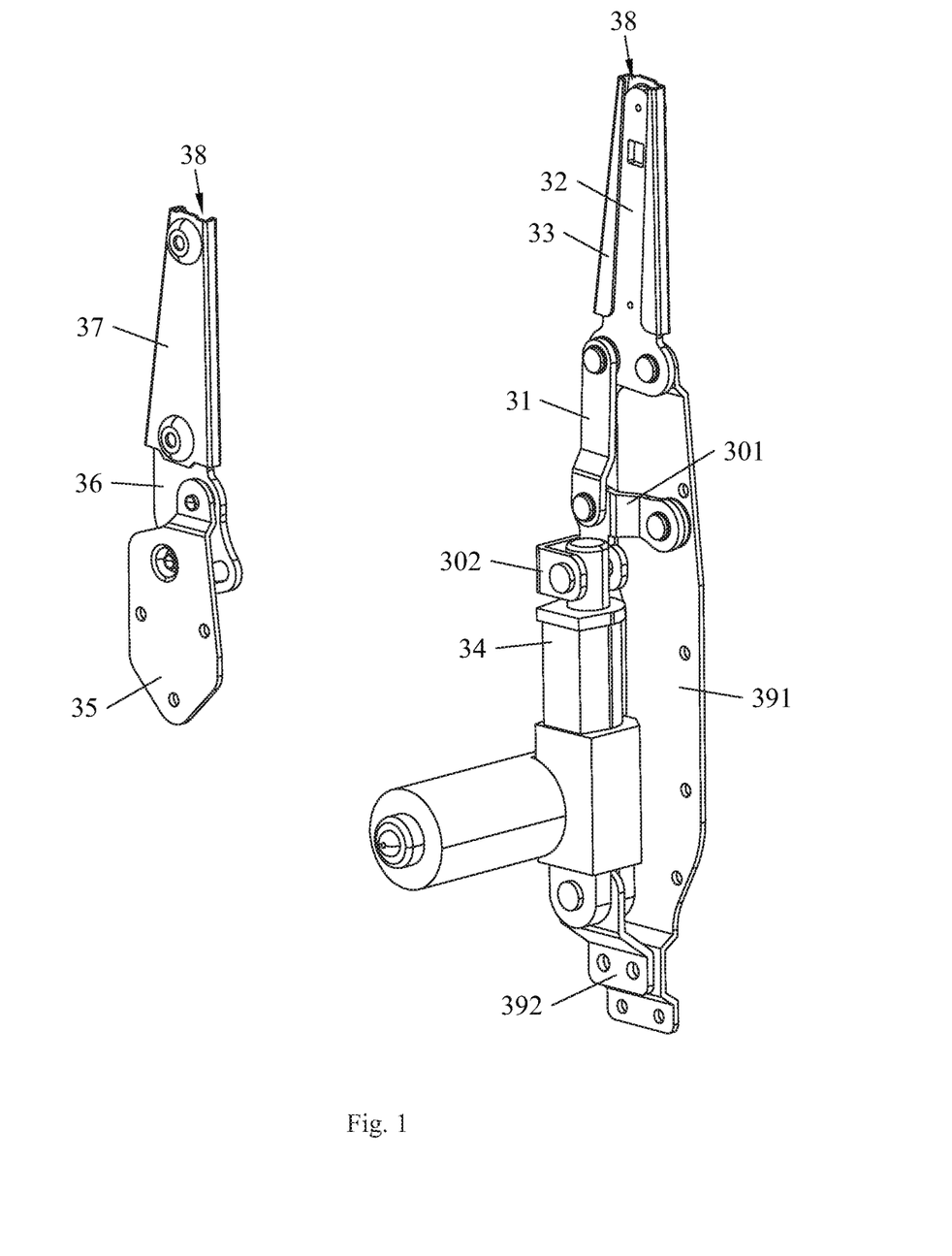
FIG. 1 is a perspective view of an automatic support system for headrest of the present invention.
Figure 2:
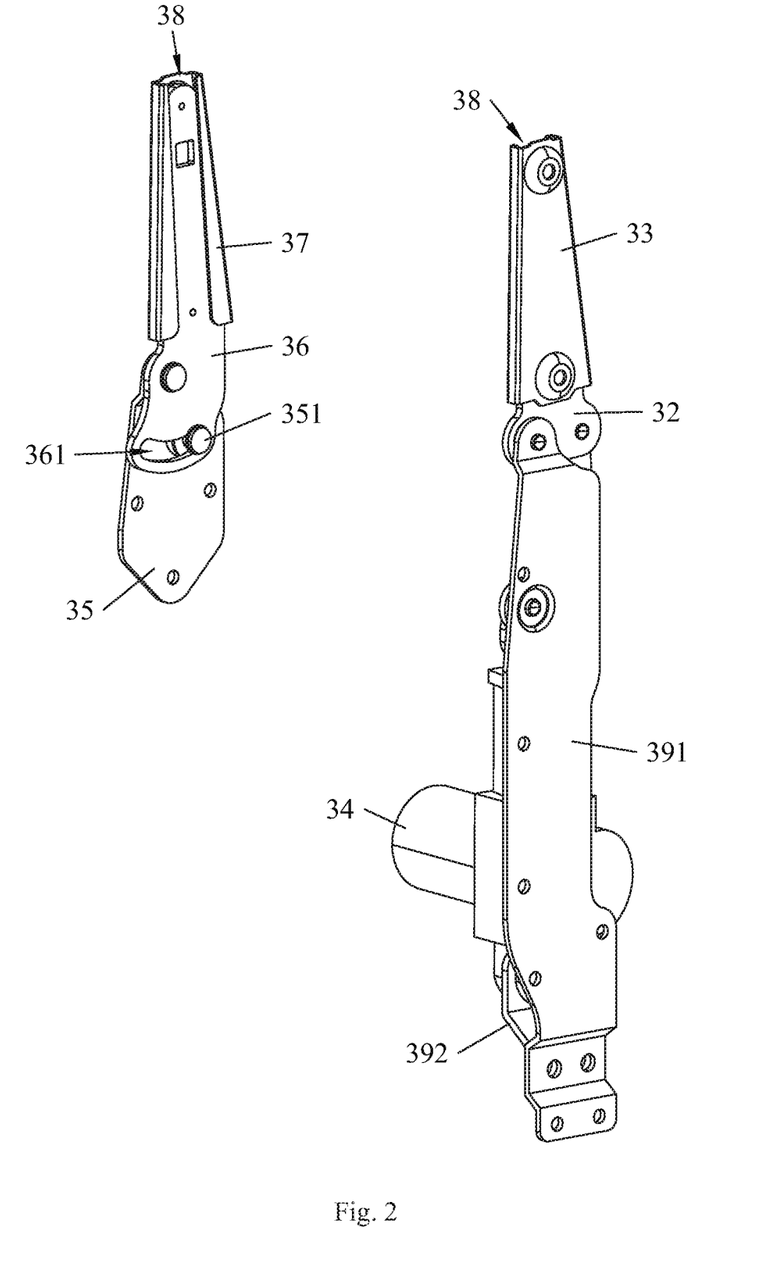
FIG. 2 is another perspective view of the automatic support system for headrest of the present invention.
Figure 3:
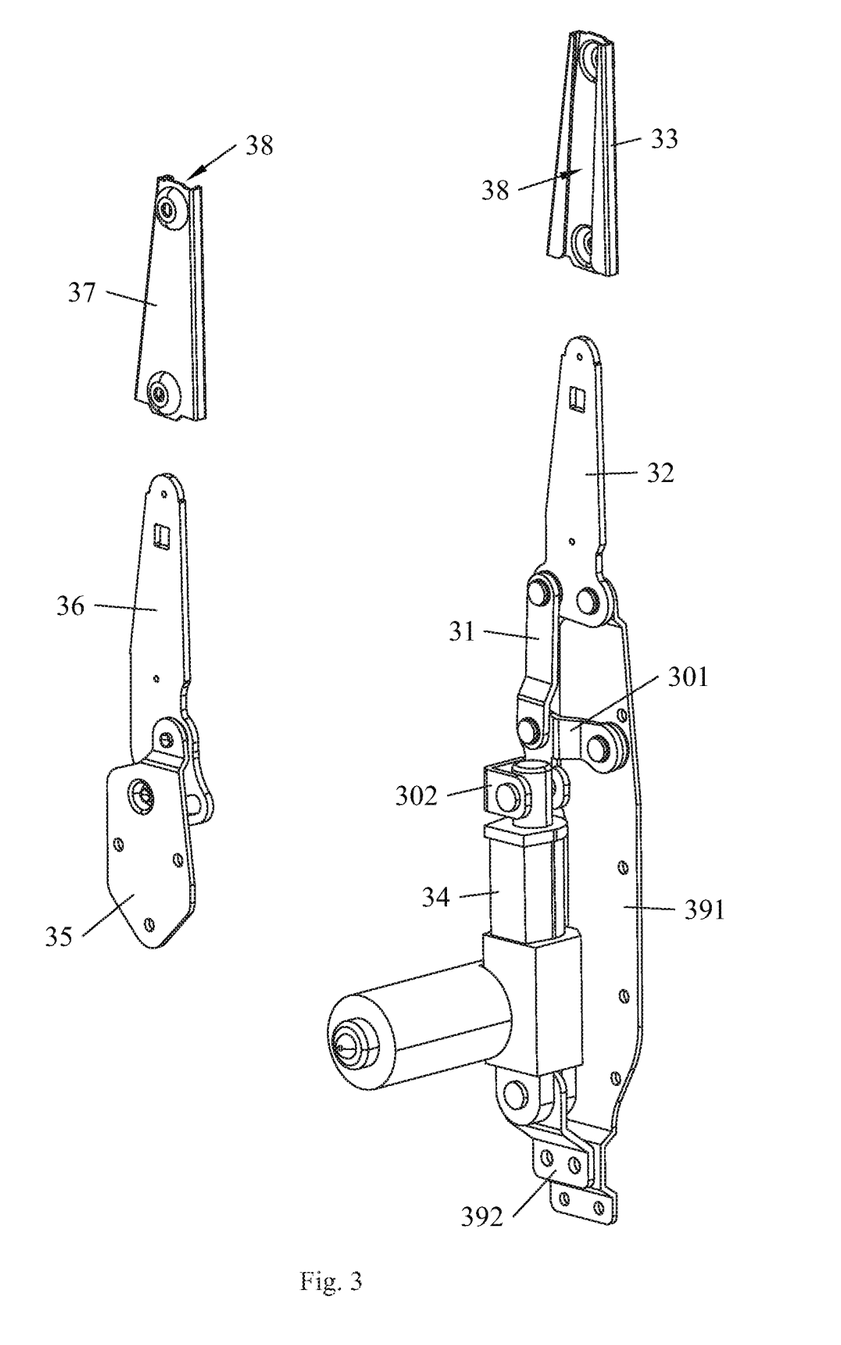
FIG. 3 is a third perspective view showing that the first and second sleeve components of the automatic support system for headrest have been removed.
Figure 4:
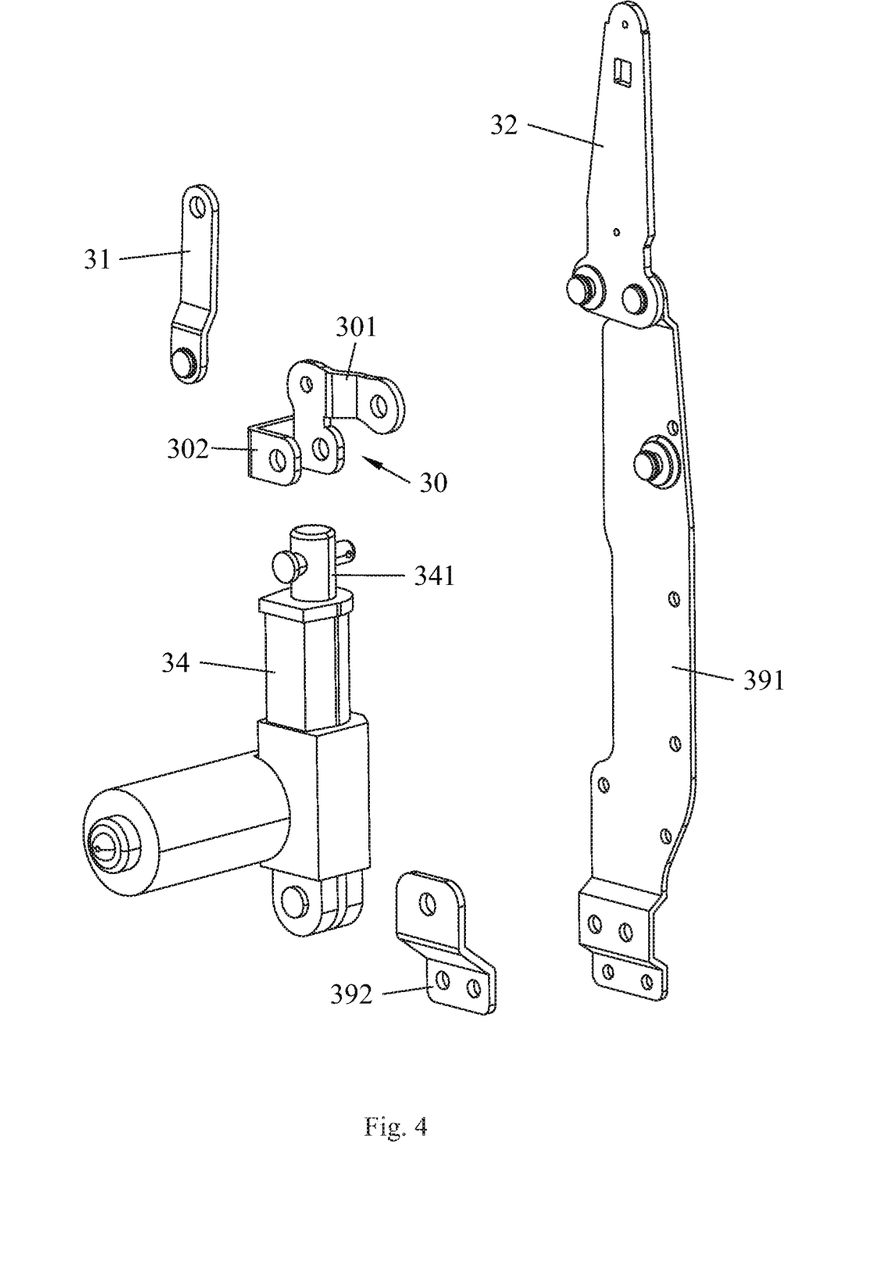
FIG. 4 is an exploded view of a first side assembly of the automatic support system for headrest.
Figure 5:
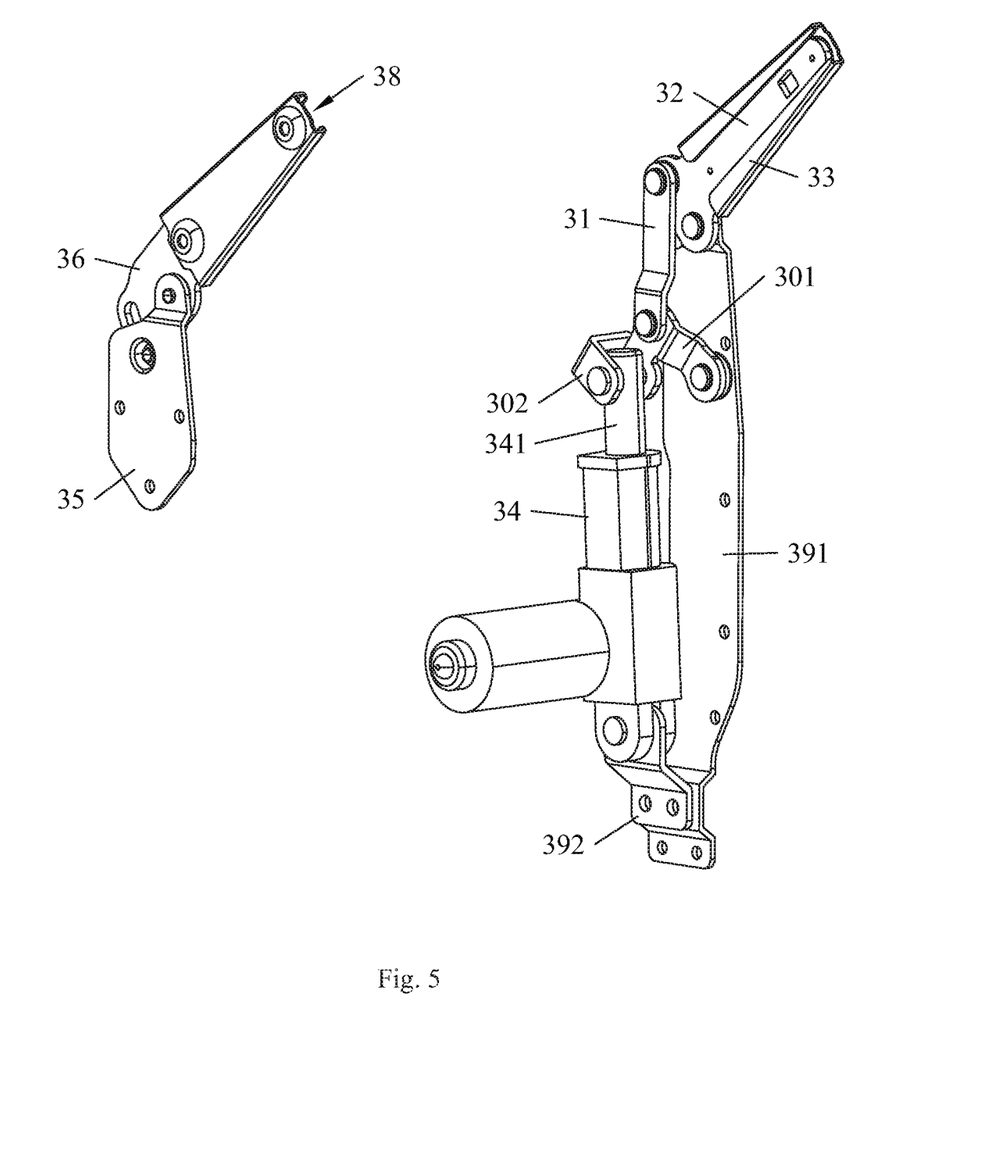
FIG. 5 is a fourth perspective view showing that the first and second swinging components of the automatic support system for headrest have been rotated 90 degree.

Referring to FIG. 5, the connecting component 30 is urged to rotate on the fixing plate 391 when the output shaft 341 of the linear drive device 34 is slid and extended out, and then the rotation of the connecting component 30 urges the first swinging component 32 to swing via the driving rod 31, so that the swing of the first sleeve component 33 relative to the fixing plate 391 is implemented. At the same time, the second swinging component 36 and the second sleeve component 37 are swung relative to the second fastener 35, the second swinging component 36 is positioned relative to the second fastener 35 when the limiting column 351 is withstood two side walls of the limiting groove 361, and the first sleeve component 32 and the second sleeve component 37 can not be swung further.

Figure 6:
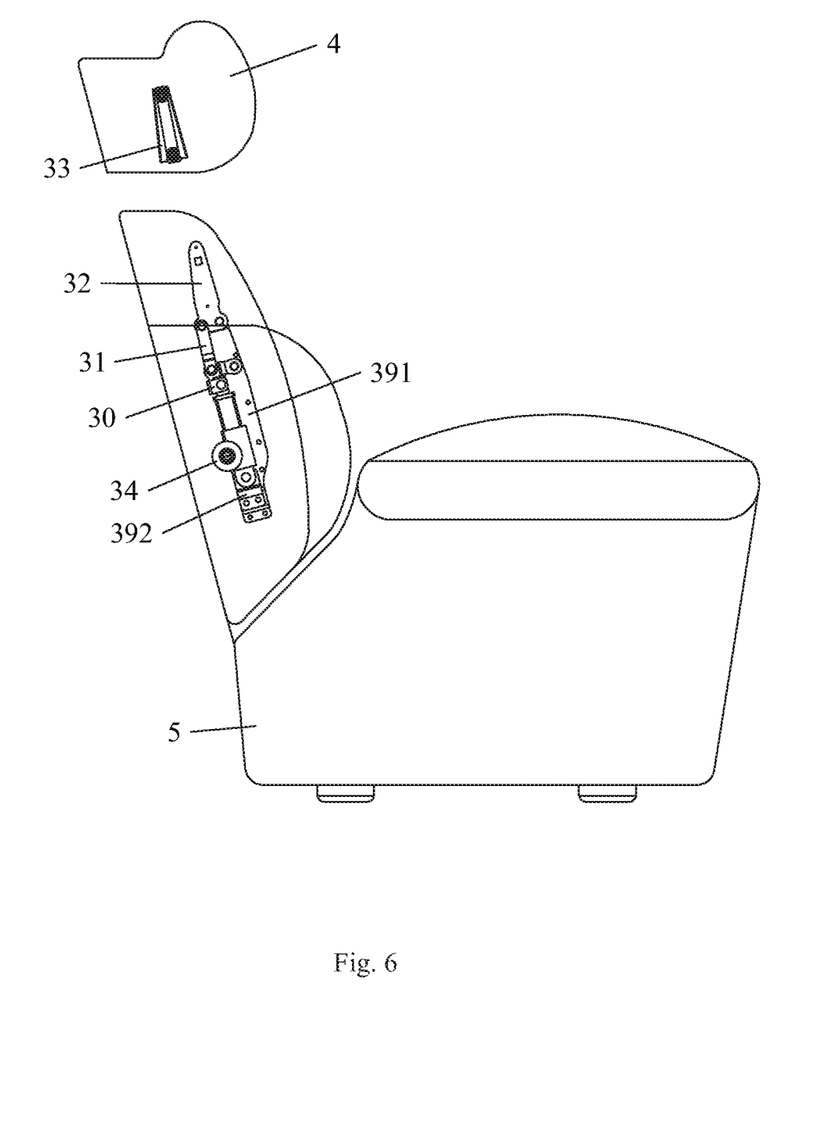
FIG. 6 is a schematic view of the automatic support system for headrest mounted in the sofa and headrest.
Figure 7:
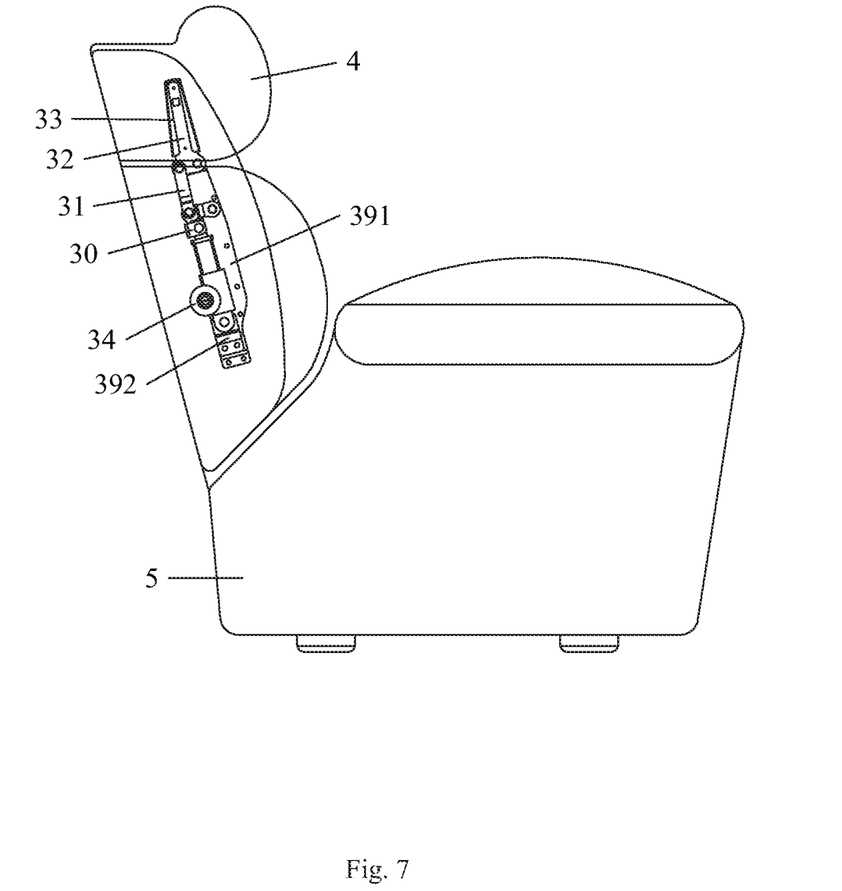
FIG. 7 is a schematic view showing that the headrest has been mounted to the sofa.
Figure 8:
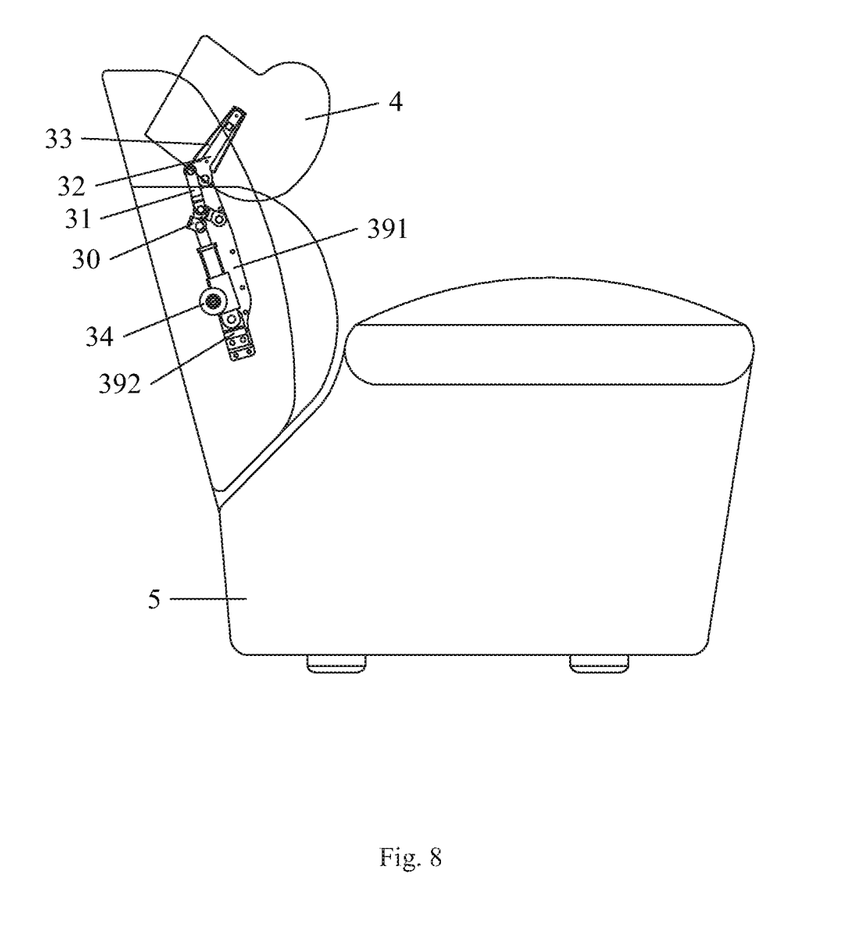
FIG. 8 is a schematic view showing that the headrest has been adjusted to a certain angle.

As shown in FIGS. 6 to 8, the first sleeve component 33 and the second sleeve component 37 are respectively fixed in two sides of the headrest 4, and the fixing plate 391 and the second fixing component 35 are respectively fixed in two sides of the sofa body 5. The first sleeve component 33 and the second sleeve component 37 are respectively set on the first swinging component 32 and the second swinging component 36, so that the headrest 4 is mounted to the sofa body 5. Starting the linear drive device 34, so that the headrest 4 can be adjusted to a certain angle relative to the sofa body 5, such as 45 degree as shown in FIG. 9.

Figure 9:
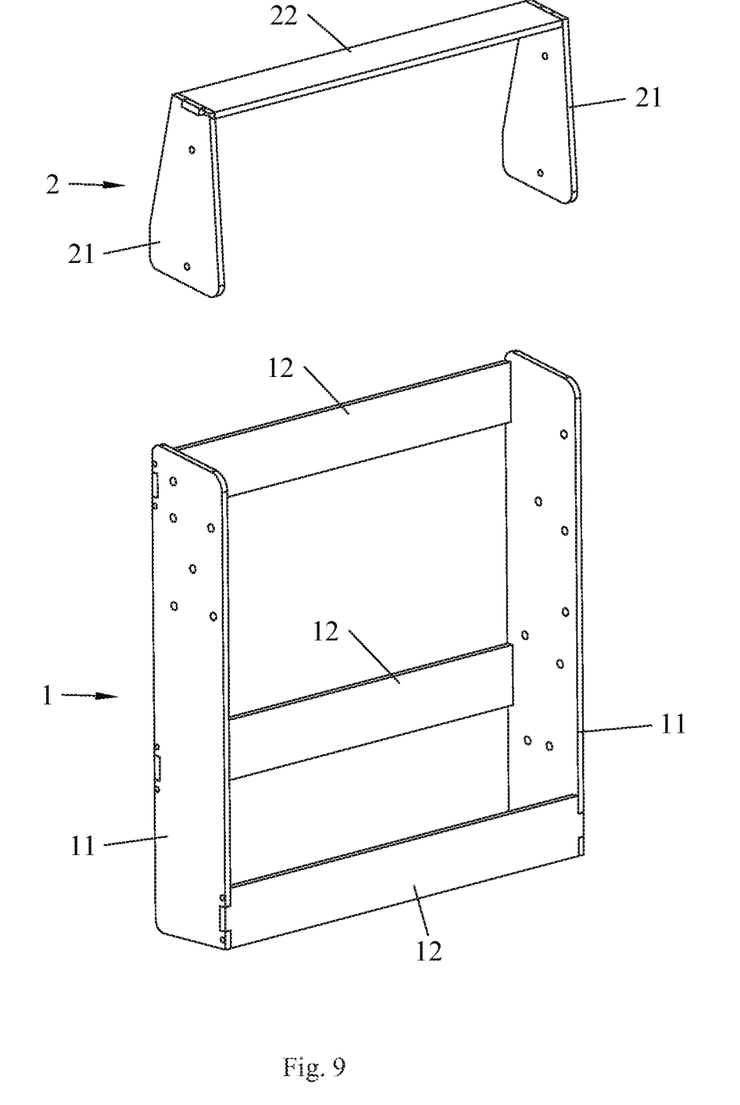
FIG. 9 is perspective view of a lower fixing frame and an upper fixing frame configured in the sofa and headrest.
Figure 10:
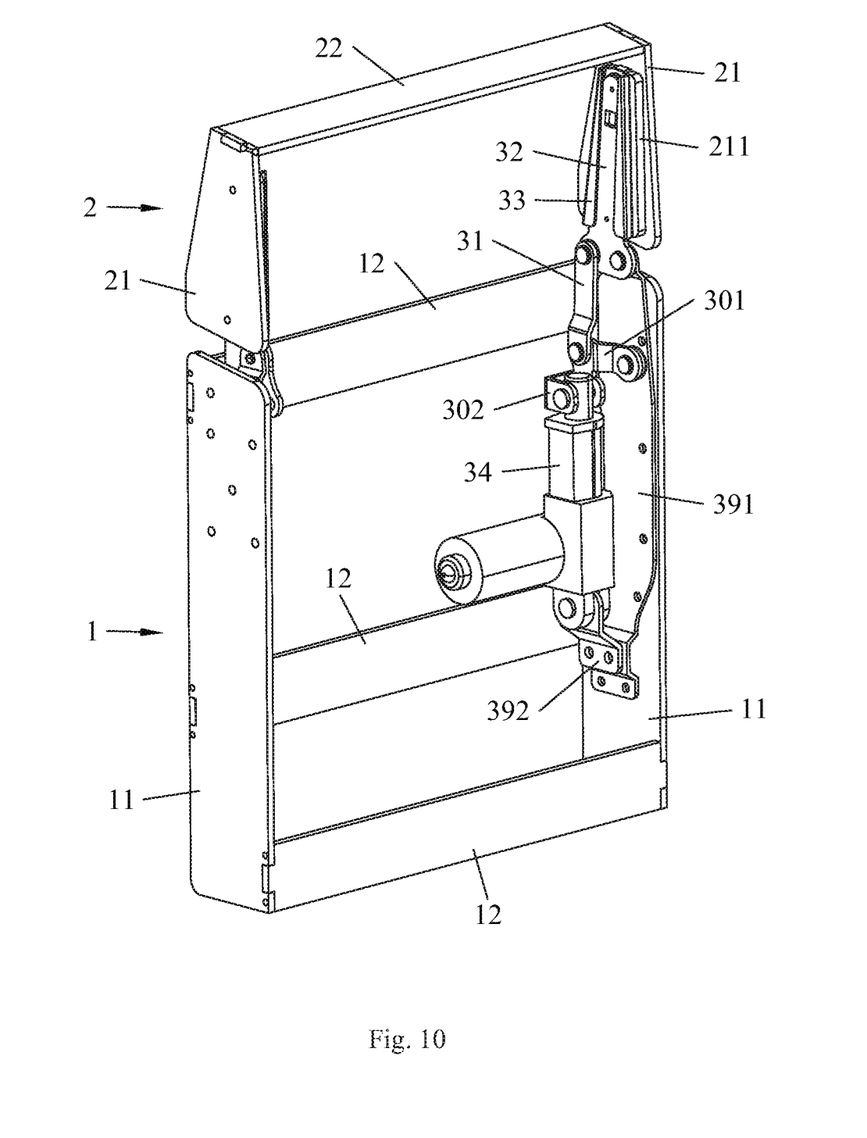
FIG. 10 is a perspective view of the automatic support system for headrest that has been mounted to the lower fixing frame and the upper fixing frame of the FIG. 9.

Referring to FIGS. 9 and 10, a wood frame is usually provided in the sofa so as to support the sofa body and the headrest. As for the detachable sofa whose headrest can be removed from the sofa body, a lower fixing frame 1 and an upper fixing frame 2 as shown in FIG. 9 are respectively configured in the sofa body and the headrest, wherein the upper fixing frame 2 includes two opposite upper side plate 21 and a top plate 22 connected and fixed between the two upper side plate 21, and the lower fixing frame 1 includes two opposite lower side plate 11 and at least one horizontal plate 12 connected and fixed between the two lower side plate 11. The number of the horizontal plates 12 is three. The upper side plate 21 and the lower side plate 11 are respectively fixed in the headrest and the sofa body by screws or other methods.

The automatic support system for headrest of the present invention can be mounted to the lower fixing frame 1 and the upper fixing frame 2, concretely, a base plate 211 is configured on an inner side of each upper side plate 21, the first sleeve component 33 and the second sleeve component 37 are respectively fixed to the two base plates 211, the fixing plate 391 is fixed to the inner side of one lower side plate 11, and the second fastener 35 is fixed to the inner side of the other lower side plate 11. Starting the linear drive device 34, the upper fixing frame 2 can be urged to swung relative to the lower fixing frame 1, so as to adjust the angle of the headrest.

In comparison with the prior art, the angle of the headrest of the headrest can be automatically adjusted by applying a linear drive device 1. Furthermore, As the first and second sleeve components are respectively set on the first and second swinging component in a sleeve-type and detachable manner, so the first and second sleeve components can be set on or removed from the first and second swinging components easily and conveniently, and the automatic support system for headrest can be applied in a detachable sofa.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. An automatic support system for headrest, comprising a first fastener, a connecting component, a driving rod, a first swinging component, a first sleeve component, and a linear drive device; wherein the linear drive device is pivotally connected to the first fastener and includes an output shaft and a driving member connected with the output shaft to drive the output shaft to make linear sliding, a front end of the connecting component is pivotally connected to the first fastener, the output shaft of the linear drive device and one end of the driving rod are respectively pivotally connected to the connecting component, a front end of the first swinging component is pivotally connected to the first fastener, the other end of the driving rod is pivotally connected to a rear end of the first swinging component, and the first sleeve component is arranged for fixing to a headrest and is detachably connected to the first swinging component.

2. The automatic support system for headrest according to claim 1, wherein the first fastener comprises a fixing plate and a mounting plate, the connecting component and the first swinging component are respectively pivotally connected to the fixing plate, a lower end of the mounting plate is fixed to the fixing plate, and the linear drive device is pivotally connected to an upper end of the mounting plate.

3. The automatic support system for headrest according to claim 1, wherein the connecting component comprises an upper end portion and a U-shaped lower end portion, the lower end portion is pivotally connected to the output shaft of the linear drive device, a front end of the upper end portion is pivotally connected to the first fastener, a rear end of the upper end portion is fixed to the lower end portion, and the one end of the driving rod is pivotally connected to the rear end of the upper end portion.

4. The automatic support system for headrest according to claim 1, wherein the first sleeve component has a slot where the first swinging component is inserted therein.

5. The automatic support system for headrest according to claim 4, wherein a lower end of the first swinging component includes the front end and the rear end, a width of the first swinging component is gradually reduced from bottom to top, and a width of the slot is configured to correspond with that of the first swinging component.

6. The automatic support system for headrest according to claim 1, wherein further comprises a second fastener, a second swinging component and a second sleeve component, the second fastener is disposed opposite to the first fastener, the second swinging component is pivotally connected to the second fastener, and the second sleeve component is fixed to the headrest and set on the second swinging component in a sleeve-type and detachable manner.

7. The automatic support system for headrest according to claim 6, wherein a limiting column is fixed to the second fastener, a curved limiting groove is opened in the second swinging component, and the limiting column is slid in the limiting groove.

8. The automatic support system for headrest according to claim 6, wherein the first fastener is fixed to a lower side plate, the second fastener is fixed to another lower side plate, a horizontal plate is connected and fixed between the two lower side plates, the first sleeve component is fixed to an upper side plate, the second sleeve component is fixed to another upper side plate, and a top plate is connected and fixed between the two upper side plates.

* * * * *